March 24, 1959 S. I. OLSEN 2,878,516
LOCKING MECHANISM FOR VULCANIZING MACHINES
Filed May 21, 1956 2 Sheets-Sheet 1
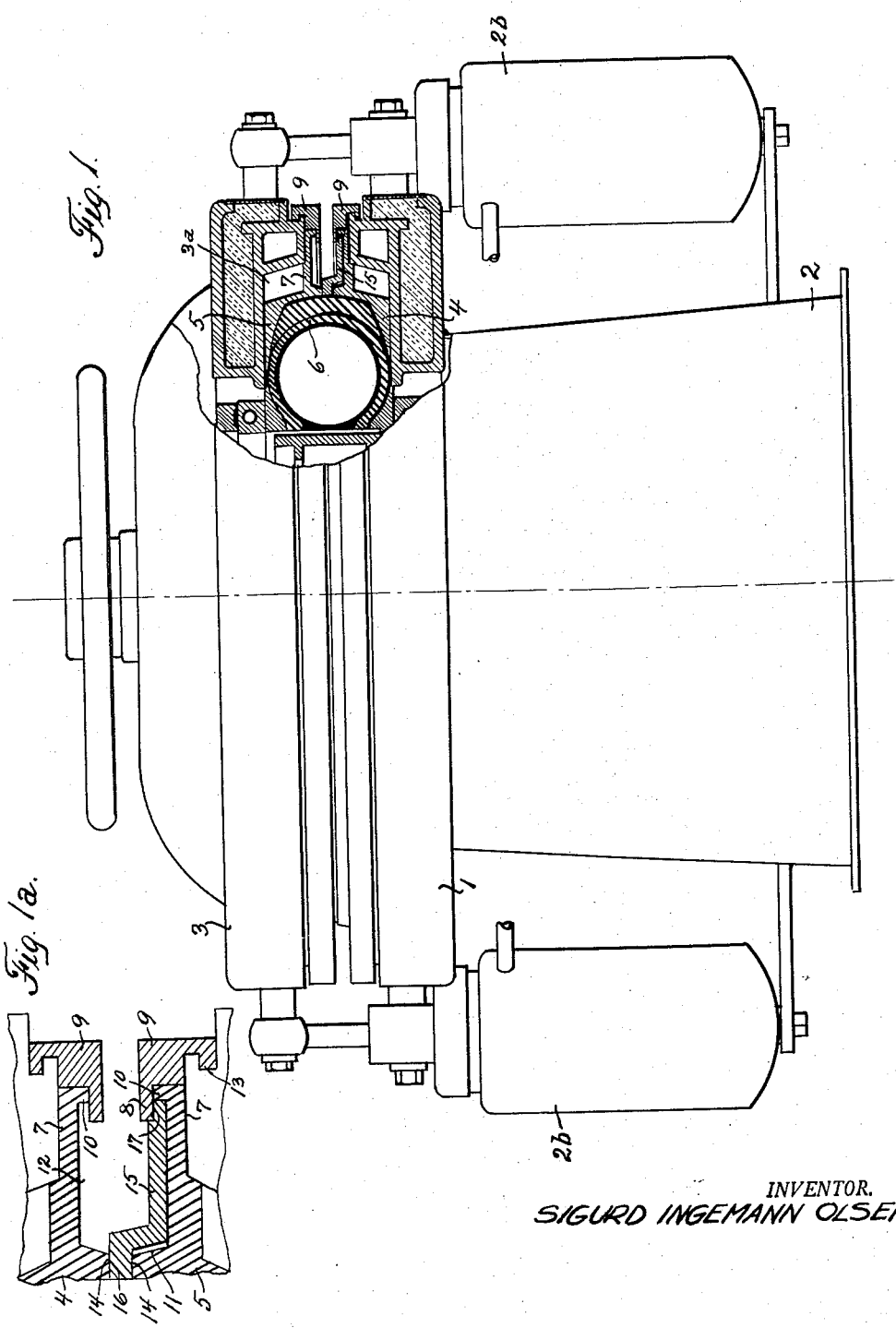
INVENTOR.
SIGURD INGEMANN OLSEN

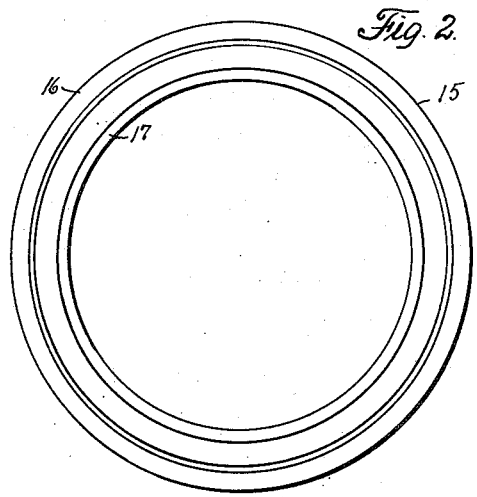
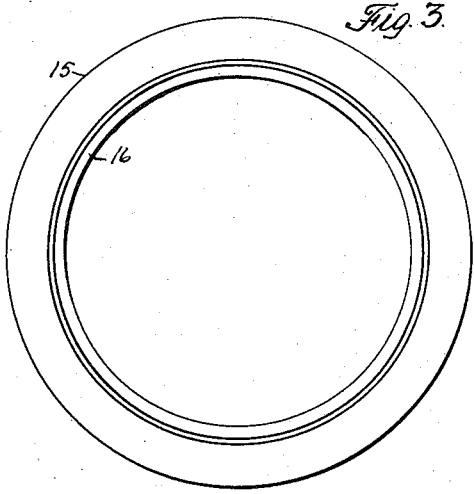
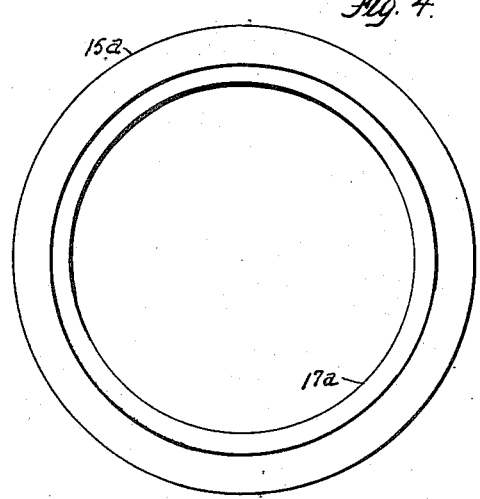
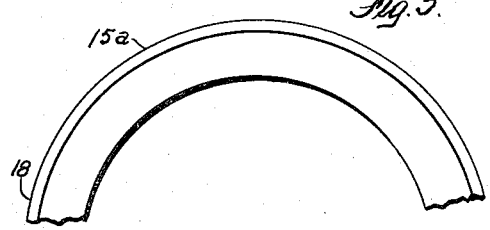
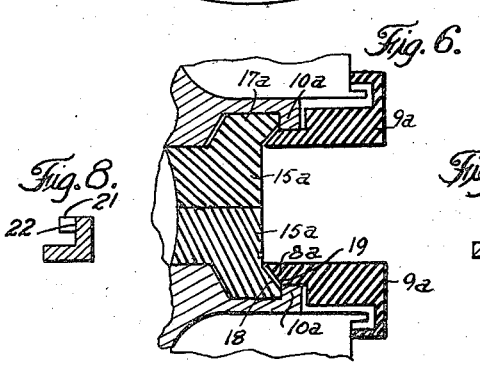
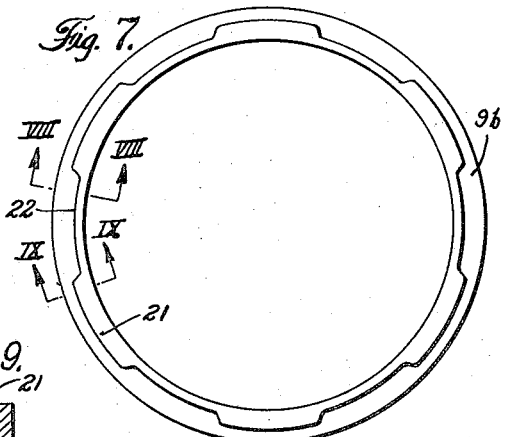
INVENTOR.
SIGURD INGEMANN OLSEN ns on lines VIII—VIII and

United States Patent Office 2,878,516
Patented Mar. 24, 1959

2,878,516

LOCKING MECHANISM FOR VULCANIZING MACHINES

Sigurd Ingemann Olsen, Odense, Denmark

Application May 21, 1956, Serial No. 586,039

4 Claims. (Cl. 18—38)

The present invention relates to a locking mechanism in a vulcanizing press for applying a tread band to a pneumatic wheel tire, and of the type comprising a stationary lower part, and an upper part arranged to be raised and lowered in relation to the lower part by hydraulic or pneumatic power means, said press parts each arranged to accommodate a removable circular mould die which is clamped in position in the press part by means of a locking ring overlapping the rims of the mould die and the press part, and between which mould dies may be inserted spacer members to vary their relative spacing.

Hitherto known locking means of this type are unable to resist for any great length of time the effects of the considerable pressures utilized in vulcanizing presses especially upon removal of the tire treated in the press, and the locking ring as well as the coacting rims of the mould dies and the spacer members become more or less warped.

The main object of the invention is to provide a locking mechanism for a vulcanizing press of the type described, by means of which it is possible to avoid deformation of the mould dies and associated locking parts.

A further object of the invention is to provide means for simultaneously locking the mould dies and a spacer member or spacing members to the press parts.

A still further object of the invention is to provide a spacer member which is simple in design, and which after insertion in a press part coacts in such a manner with the mould die and the locking member that it supports the mould die and is automatically locked to this when the locking member locks the mould die in the press part.

Yet another object of the invention is to provide a reinforcement of the part of the mould die engaged by the locking member.

Another object of the invention is to provide spacer members which can be used in the same vulcanising press for applying treads to tires of various sizes.

Yet another object of the invention is to provide spacer members which while cold can be inserted in hot press.

Further, an object of the invention is to provide a spacer member which may easily be removed while hot from a hot press.

Other objects of the invention will be evident from the following description of a vulcanizing press taking in conjunction with the accompanying drawing, in which Fig. 1 shows in side elevation a vulcanizing press with the right hand end of the press parts in section, and Fig. 1a an enlarged fragment thereof, Figs. 2 and 3 show a spacing ring as shown in Fig. 1 seen from the outer and inner surfaces respectively, Figs. 4 and 5 show a spacing ring as shown in Fig. 6 seen from the outer and inner side respectively, Fig. 6 is a section corresponding to the section in Fig. 1 but with two relatively thick spacing rings for large tires, Fig. 7 shows in plan elevation a locking ring; and Figs. 8 and 9 are sections on lines VIII—VIII and IX—IX respectively in Fig. 7.

Referring to Fig. 1, this shows in cross section one side of a vulcanizing press for applying a tread to a pneumatic tire of small size. The press comprises a circular lower part 1 rigidly attached to a base 2. This lower part is provided in known manner per se with a steam chamber 1a and hydraulic or pneumatic operating members 2a. Since these devices do not constitute a part of the invention they are not subjected to a detail description.

To the said lower part 1 is attached by means not shown a circular upper part 3 likewise provided with steam chamber 3a and hydraulic pneumatic operating means 2b. Within the lower part 1 is removably arranged an annular mould die 4, and within the upper part is removably arranged a correspondingly shaped annular mould die 5, which two dies in combination shape the tread to be applied to a tire 6.

The two mould dies 4 and 5 consists of symmetrical rings, and each die is provided with a radially extending flange 7 constituting clamping means coacting with an overlapping locking flange 8 on a locking ring 9. On the side of each flange 7 facing the other mould die there is provided a peripheral projection 10, and inwardly spaced from this projection there is an inwardly inclined face 11, thus producing between the projection and face an annular recess 12. In locking position the overlapping flange 8 of the locking ring 9 engages the upper surface of the peripheral projection 10 and extends somewhat in over the recess 12. The two locking rings 9 engage the upper press parts 1 and 3 respectively by means of conventional bayonet locks 13.

When the press is to be used for applying a tread to a small sized tire the mould dies 4 and 5 abut each other with their surfaces 14, in which position each mould die is clamped in position by means of a locking ring 9.

As shown in Figs. 7, 8 and 9, a locking ring 9b is provided with a bayonet lock, the ring having substantially U-shaped cross section, the one leg 20 being somewhat longer than the other leg 21. This shorter leg 21 has a plurality of interspaced incisions or slots engaging the projections 21 of the locking ring. Upon fitting the ring in place and rotating it in relation to the mold part, the projections 21 of the ring are moved in between the legs of the mold flange, while the projecting parts of the mold frame are engaged by the projections 21.

When the press is to be used for applying a tread to a medium sized tire an annular spacer member 15 is inserted between the surfaces 14. This spacer member is provided with an inwardly extending flange 16 for insertion between the surfaces 14 of the mould dies, and an offset outwardly extending flange 17 of a thickness equal to the height of the peripheral projection 10 on the flange 7 of the mould die. The part of the spacer member with the flange 17 is so shaped that when inserted within the recess 12 of one of the mould dies it abuts the inner surface of the projection 10 but is somewhat spaced from the inclined surface 11 of the mould die. When the spacer member 15 is placed in position on the mould die it is locked in this position by means of the locking flange 8 of the locking ring 9. If required a spacer member 15 may be attached to each mould die in the manner described, the outer surfaces of the flanges 16 abutting each other.

In presses for use in connection with large tires there are employed spacer members as those shown in Fig. 2, in which for corresponding parts the same reference characters as used in Fig. 1 are used with the addition of the letter a. The overlapping flange 8a of each locking ring 9a has a bevelled inner end surface 19 which serves as abutment for a correspondingly bevelled edge 18 formed on the outer circumference of the spacer member 15a and has the same width as the bevelled end surface 19. When inserted between the mould members each peripheral flange 17a of the spacer members 15a will engage the mould die recess, and upon application of the locking ring 9a, the bevelled surface 19 will abut the bevelled surface 18 on the spacer member thus locking the spacer member to the mould die and at the same time locking the mould die 15a to the press part. It is obvious that a single spacer member 15a can be used in the same manner as shown in Fig. 1, since in all events the mould dies will both be locked to their respective press parts.

What I claim is:

1. A die assembly in a vulcanizing press for applying a tread band to a pneumatic tire and of the type comprising a stationary lower press part and an upper press part arranged to be raised and lowered in relation to the lower press part by hydraulic or pneumatic means, said press parts each having a detachably mounted annular mold die, a circular flange extending outwardly from said mould die, said flange of each die having an annular projection along the outer peripheral edge of each mould die facing the other mould die, a spacer member between the mould dies, a peripheral flange extending outwardly from said spacer member and dimensioned to abut the inner periphery of the said annular projection on one of the mould dies, a locking ring, a peripheral flange projecting from the inner edge of said locking ring projecting over the said annular projection of said die and the said peripheral flange of the spacer member, and a bayonet locking flange formed along the outer periphery of the locking ring for engagement with the press part.

2. The die assembly as claimed in claim 1, in which the thickness of the peripheral flange of the spacer member is equal to the height of the annular projection on the mould die.

3. The die assembly as claimed in claim 1, in which the clamping member of the locking ring has a bevelled inner end surface which serves as abutment for a correspondingly bevelled edge formed on the outer circumference of the spacer member and having the same width as said bevelled inner end surface.

4. The die assembly as claimed in claim 1, in which the circular flange of the mould die is so shaped that it forms the base of an annular recess outwardly limited by the inner side of the annular projection and inwardly inclined surface, which annular recess serves to engage the peripheral flange and adjacent parts of a spacer member, which spacer member parts in combination have such a radial width that the inclined surface of the mould die and an oppositely disposed inclined surface on the spacing member do not abut each other when the spacing member is inserted between the mould dies.

References Cited in the file of this patent

UNITED STATES PATENTS

| | | |
|---|---|---|
| 631,292 | Fyfe et al. | Aug. 22, 1899 |
| 1,899,211 | Shook | Feb. 28, 1933 |
| 2,243,532 | Maynard | May 27, 1941 |
| 2,308,948 | Bosomworth | Jan. 19, 1943 |
| 2,333,588 | Schaevitz | Nov. 2, 1943 |
| 2,372,644 | Bacon | Apr. 3, 1945 |